(12) United States Patent
Hunter

(10) Patent No.: US 8,327,896 B2
(45) Date of Patent: Dec. 11, 2012

(54) SPLIT REAR WHEEL ASSEMBLY FOR A MOTORCYCLE

(76) Inventor: Rod Hunter, Wymark (CA)

( * ) Notice: Subject to any disclaimer, the term of this patent is extended or adjusted under 35 U.S.C. 154(b) by 944 days.

(21) Appl. No.: 12/272,039

(22) Filed: Nov. 17, 2008

(65) Prior Publication Data
US 2009/0126841 A1 May 21, 2009

(30) Foreign Application Priority Data

Nov. 15, 2007 (CA) .................................. 2610623

(51) Int. Cl.
B60C 5/00 (2006.01)
B60B 11/00 (2006.01)
B60B 11/02 (2006.01)

(52) U.S. Cl. ...... 152/450; 152/376; 301/36.1; 301/36.2; 301/36.3

(58) Field of Classification Search .................. 152/450, 152/376; 301/36.1, 36.2, 36.3
See application file for complete search history.

(56) References Cited

U.S. PATENT DOCUMENTS

| | | | |
|---|---|---|---|
| 552,984 A * | 1/1896 | Broers | 301/36.1 |
| 1,160,323 A * | 11/1915 | Richards | 152/30 |
| 4,003,443 A | 1/1977 | Boughers | |
| 6,415,837 B1 * | 7/2002 | Mackle et al. | 152/209.5 |
| 6,733,088 B2 * | 5/2004 | Elkow | 301/40.6 |

FOREIGN PATENT DOCUMENTS

| | | | |
|---|---|---|---|
| CH | 564435 | * | 7/1975 |
| CN | 200942680 | * | 9/2007 |
| DE | 4204642 | * | 7/1993 |
| EP | 1238824 | * | 9/2002 |
| EP | 1086833 | * | 3/2011 |
| JP | 2001088502 | * | 4/2001 |
| WO | 99/50133 A1 | | 10/1999 |

* cited by examiner

Primary Examiner — Justin Fischer
(74) Attorney, Agent, or Firm — Standley Law Group LLP

(57) ABSTRACT

A tire has a first and second beads mounted on a rim. A first sidewall extends upward from the first bead to a first edge of a horizontal tread face located substantially directly above the first bead. A second sidewall extends upward from the second bead and curves toward a second edge of the tread face such that a curved tire surface is provided between the second bead and the second edge of the narrow tread face. Two tires are mounted on a rear motorcycle axle such that a gap is defined between first sidewalls of the right and left tires, and a drive extends through the gap to the axle. When the motorcycle is leaned in a curve, one of the wheels is above the ground surface, and the motorcycle is supported on the curved tire surface of the other tire.

18 Claims, 3 Drawing Sheets

SPLIT REAR WHEEL ASSEMBLY FOR A MOTORCYCLE

CROSS-REFERENCE TO RELATED APPLICATIONS

This application claims foreign priority based upon Canadian Patent Application Serial No. 2,610,623, filed Nov. 15, 2007, the content of which is incorporated by reference as if fully recited herein.

TECHNICAL FIELD

This invention is in the field of rear wheels for a motorcycle and more particularly a split rear tire for a motorcycle.

BACKGROUND

It has become common for some people to put oversize rear tires on motorcycles. Technically, these larger rear tires will provide more grip for a user (especially in straight line acceleration), which is often desirable as motorcycles become more and more powerful. However, in many cases, the motorcycle owner simply likes the appearance of the motorcycle with a wider rear tire.

It has become common to see rear wheels and kits for motorcycles that allow rear tires up to 8" or more in width to be added to a motorcycle. Typically, these kits include a rear frame for the rear wheel that replaces the stock rear frame on the motorcycle. The belt running from the transmission to the sprocket on the rear wheel is usually moved further out to the side of the motorcycle in order to clear the new wider rear wheel.

However, moving the belt out further to the side of the motorcycle has disadvantages. For example, moving the belt further out from the transmission makes it stick out that much further from the side of the motorcycle and creates a greater risk of something getting hit or caught by the belt (such as the ankle or leg of a rider). This is even more dangerous when you consider that while the motorcycle is in motion this belt is often moving quite fast. In addition, the further the belt is moved out from the side of the motorcycle the more offset the power being transferred to the rear wheel of the motorcycle which can cause a number of complications. The width of rear wheel that can be used is also limited by the amount this belt can be moved out to the side of the motorcycle so that it clears the new wider rear wheel of the motorcycle.

Some rear wheel assemblies for motorcycles have been designed that split the rear wheel of the motorcycle so that two separate tire sections are present and the drive train used to drive the rear wheel passes between the two separate tire sections. U.S. Pat. No. 4,003,443 to Boughers and PCT Published App. WO99/50133 to Nemeth both show motorcycles with the rear wheel separated into two tire sections in this manner. However, in order to allow the motorcycle to be leaned during a turn by a rider, both of these devices require extensively modified rear suspensions. In Bougers the suspension allows the two tires to move independently from each other in a vertical direction during the turn, while in Nemeth the rotational plane of the tires remains vertical, and the suspension allows the motorcycle frame to tilt with respect to the tires.

SUMMARY OF THE INVENTION

It is an object of the present invention to provide a rear tire and rear wheel assembly for a motorcycle that overcomes problems in the prior art.

In a first embodiment the present invention provides an inflatable tire comprising a first bead and a second bead adapted to be mounted on a rim. A first sidewall extends upward from the first bead to a first edge of a substantially horizontal tread face located substantially directly above the first bead. A second sidewall extends upward from the second bead and then curves toward a second edge of the tread face such that a curved tire surface is provided between the second bead and the second edge of the tread face. The tread face has a width that is less than half of a distance between the first and second beads.

In a second embodiment the present invention provides a rear wheel apparatus for a motorcycle. The apparatus comprises a right wheel mounted on an axle, the right wheel comprising a right tire mounted on a right rim and with a left sidewall extending upward from a left bead to a left edge of a substantially horizontal tread face located substantially directly above the left bead, and a right sidewall extending upward from a right bead and then curving toward a right edge of the tread face such that a curved tire surface is provided between the right bead and the right edge of the tread face, wherein the tread face has a width that is less than half of a distance between the right and left beads; a left wheel mounted on the axle, the left wheel comprising a left tire mounted on a left rim and with a right sidewall extending upward from a right bead to a right edge of a substantially horizontal tread face located substantially directly above the right bead, and a left sidewall extending upward from the left bead and then curving toward a left edge of the tread face such that a curved tire surface is provided between the left bead and the left edge of the tread face, wherein the tread face has a width that is less than half of a distance between the right and left beads. The right and left wheels are mounted on the axle such that a gap is defined between the right and left wheels, and a drive extends through the gap to the axle to rotate the right and left wheels and drive the motorcycle. The right and left tires are configured such that when the motorcycle is oriented in a substantially vertical position, tread faces of the right and left wheels are on a ground surface, and such that when the motorcycle is in a leaning position, one of the right and left wheels is above the ground surface, and the motorcycle is supported on the curved tire surface of the other of the right and left tires.

In this manner, the power transmission from the engine in the motorcycle can be oriented along a centerline of the motorcycle and the rear wheel instead of requiring the drive train to be moved further out to the side of the motorcycle. Rather then requiring a complex suspension setup that allows the right and left tires to move independently in the vertical direction from the other, as shown in the prior art, the right and left tires can remain fixed in the vertical direction relative to each other and the rider can lean the motorcycle in a turn by rolling the motorcycle over onto one of the curved tire surfaces. The rear wheel can be mounted in a frame and this frame can be mounted to a motorcycle typically using the same suspension setup as the stock motorcycle uses.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
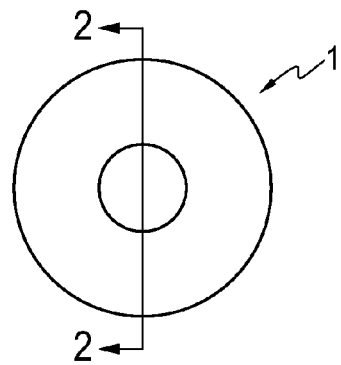
FIG. 1 is a side view of an embodiment of a tire of the present invention.
Figure 2:
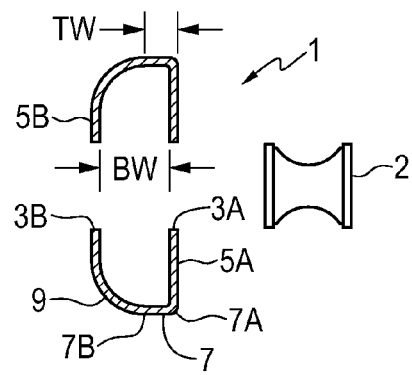
FIG. 2 is a schematic sectional view of the embodiment of FIG. 1 along line 2-2.

FIGS. 1 and 2 illustrate an embodiment of an inflatable tire 1 of the present invention. The tire 1 comprises a first bead 3A and a second bead 3B adapted to be mounted on a rim 2, such as that shown beside the tire 1 in FIG. 2.

A first sidewall 5A extends upward from the first bead 3A to a first edge 7A of a substantially horizontal tread face 7 located substantially directly above the first bead 5A. A second sidewall 5B extends upward from the second bead 3B and then curves toward a second edge 7B of the tread face such that a curved tire surface 9 is provided between the second bead 3B and the second edge 7B of the tread face 7. For clarity the term "upward" is used herein in the sense that the sidewalls 5A, 5B extend outward from the beads 3A, 3B, and "upward" (and downward for that matter) in the sectional drawings.

Figure 3:
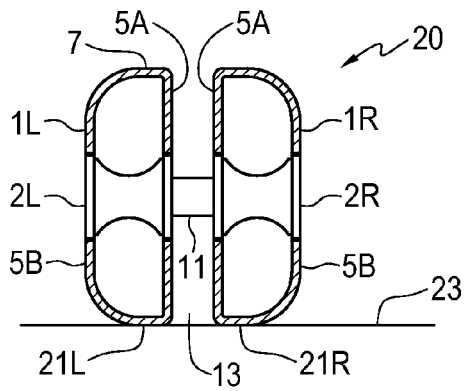
FIG. 3 is a schematic sectional view of a rear wheel assembly for a motorcycle comprising a pair of tires of FIG. 1 mounted on an axle with a gap between the right and left tires.

It is contemplated that the width TW of the tread face 7 could vary, but in any event the width TW will be less than half of a distance BW between the first and second beads 3A, 3B in order to provide a sufficiently long curved tire surface 9. The illustrated curved tire surface 9 is curved to approximately follow the radius of a circle. FIG. 3 schematically illustrates a pair of tires 1 mounted on an axle 11 with a gap 13 between the right tire 1R and the left tire 1L.

Figure 4:
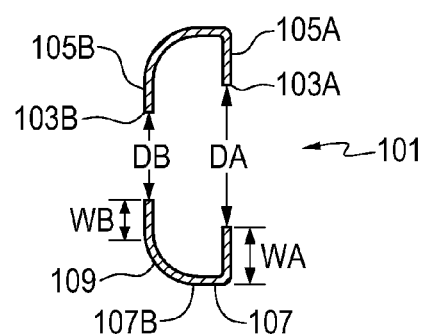
FIG. 4 is a schematic sectional view of an alternate embodiment of a tire of the present invention where the first bead has diameter larger than that of the second bead.

FIG. 4 schematically illustrates an alternate embodiment of the tire 101 of the invention where the first bead 103A has a diameter DA that is larger than a diameter DB of the second bead 103B such that the second sidewall 105B extends upward substantially the same distance WB as the first sidewall WA before the second sidewall 105 curves toward the second edge 107B of the tread face 107. It is contemplated that having the sidewalls 105A, 105B thus balanced and configured may improve the dynamic performance of the tire 101.

Figure 8:
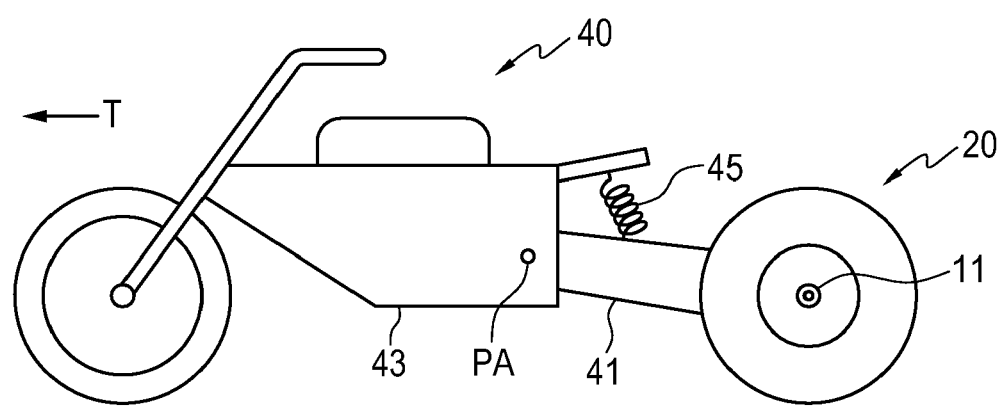
FIG. 8 is a schematic side view of a motorcycle apparatus comprising the rear tire and wheel apparatus of FIG. 3 or FIG. 6.

A rear tire and wheel apparatus 20 for a motorcycle is illustrated in FIG. 8 mounted on a motorcycle. The apparatus 20 comprises, as schematically illustrated in FIG. 3, a right wheel 21R comprising a right tire 1R as in FIG. 2 mounted to a right rim 2R. The right wheel 21R is mounted on the axle 11 such that the first sidewall 5A of the right tire 1R is on a left side of the right wheel 21R. A left wheel 21L comprises a left tire 1L as in FIG. 2 mounted to a left rim 2L. The left wheel 21L mounted on the axle 11 such that the first sidewall 5A of the left tire 1L is on a right side of the left wheel 21L. The gap 13 is thus defined between first sidewalls 5A of the right and left tires 1R, 1L, and the second sidewalls 5B thereof are on the outside of the apparatus 20, and the curved tire surfaces 9 of each tire 1R, 1L are on the outside of the apparatus 20. The right and left wheels 21R, 21L are thus rotatably mounted to the rigid axle 11 such that they rotate about the same rotational axis, and move together as the axle 11 moves.

Figure 5:
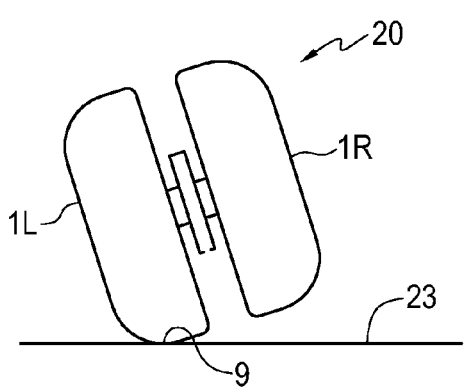
FIG. 5 is a schematic rear view of the rear wheel assembly of FIG. 3 in a leaned over position, such as when mounted on a motorcycle making a curve.

Thus when the apparatus 20 is attached to a motorcycle the right and left tires 21R, 21L are configured such that when the motorcycle is oriented in a substantially vertical position as illustrated in FIG. 3, tread faces 7 of the right and left wheels 21R, 21L are on the ground surface 23, and such that when the motorcycle is in a leaning position to the left, as illustrated in FIG. 5, the right wheel and tire 1R are above the ground surface 23, and the left tire 1L essentially rolls over onto the curved tire surface 9 of the left tire 1L and the motorcycle is supported on the curved tire surface 9 of the left tire 1L. The motorcycle rides on the curved tire surface 9 and the motorcycle maneuvers much like a conventional motorcycle.

This is in contrast to the prior art two tire systems where each wheel is independently suspended as in U.S. Pat. No. 4,003,443 to Boughers, or where the motorcycle tilts with respect to the wheels and the tires stay flat on the ground, as in PCT Published App. WO99/50133 to Nemeth.

Figure 6:
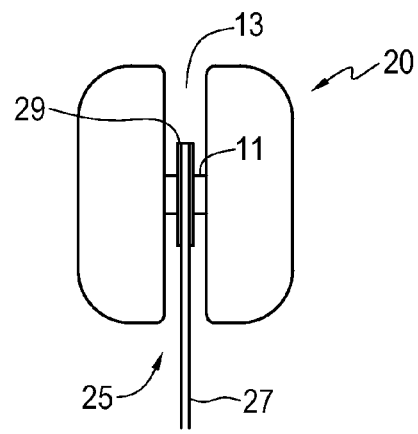
FIG. 6 is a schematic top sectional view of the rear wheel assembly of FIG. 3 with a chain or belt drive driving the axle.

As illustrated schematically in FIG. 6, a drive 25 extends through the gap 13 to the axle 11 to rotate the right and left wheels 21R, 21L and drive a motorcycle to which the apparatus 20 is attached. The drive 25 will typically comprises a chain or belt 27 extending through the gap 13 and engaging a sprocket or pulley 29 on the axle 11.

Figure 7:
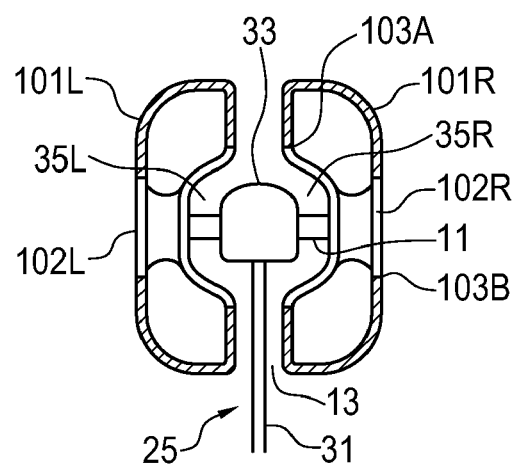
FIG. 7 a schematic sectional view of an alternate rear wheel assembly for a motorcycle comprising a pair of tires of FIG. 4 mounted on an axle with a gap between the right and left tires.

Alternately, as shown in FIG. 7, the drive 25 can comprise a driveshaft 31 extending through the gap 13 and driving a gear box 33 on the axle 11. The embodiment of FIG. 7 shows the tires 101 of FIG. 4 where the first bead 103A of the right and left tires 101A, 101B has a diameter larger than the second bead 103B of the right and left tires, and wherein the right and left rims 102R, 102L are dished to define corresponding right and left recesses 35R, 35L beside the gap 13. The gear box 33 occupies the right and left recesses 35R, 35L. The dished rims 102R, 102L provide increased room to mount the gear box 33 on the axle 11.

FIG. 8 schematically illustrates a motorcycle apparatus 40 comprising the rear tire and wheel apparatus 20 of described above and a frame member 41 attached to the axle 11 of the apparatus 20 at a rear end thereof. The frame member 41 is pivotally attached to the motorcycle front portion 43 about a substantially horizontal pivot axis PA oriented substantially perpendicular to a motorcycle operating travel direction T. In the embodiment of FIG. 8, the rear end of the frame member 41 extends through the gap and is attached to a middle section of the axle 11. Typically a bias element 45 will be provided to exert a downward bias force BF on the frame member 41 relative to the motorcycle front portion 43 to provide a suspension such as in a conventional motorcycle.

Figure 9:
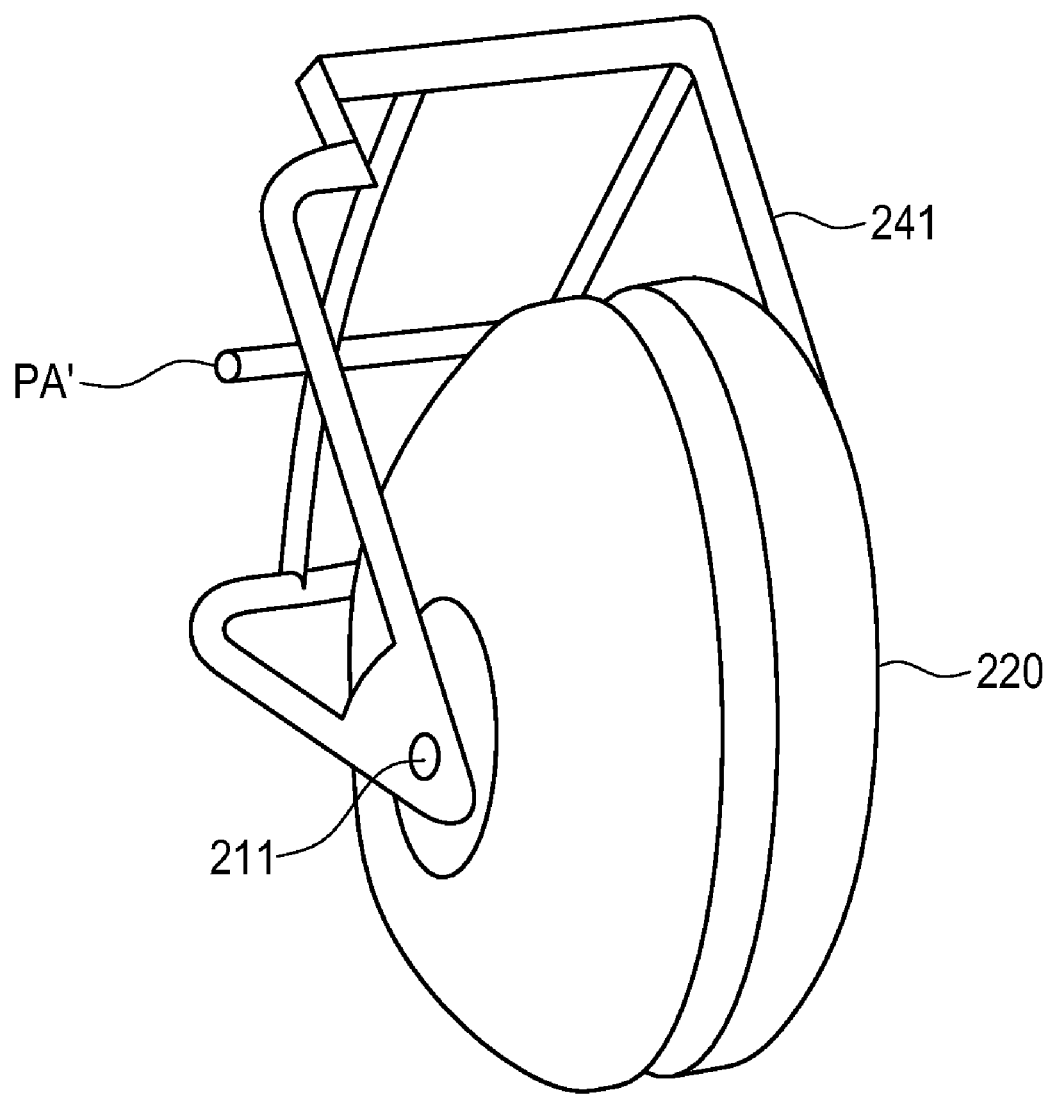
FIG. 9 is a schematic perspective view of an alternate apparatus where the frame member of the motorcycle is attached to outer ends of the axle of the rear wheel assembly.

FIG. 9 illustrates an alternate embodiment where the rear end of the frame member 241 is attached to corresponding right and left ends of the axle 211 of the apparatus 220. The front end of the frame member 241 is pivotally attached to the motorcycle front portion about a substantially horizontal pivot axis PA'.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A rear tire and wheel apparatus for a motorcycle, the apparatus comprising:
 a right wheel and a left wheel, comprising:
  a right tire and a left tire, each tire being an inflatable tire that comprises a first bead and a second bead adapted to be mounted on a rim; a first sidewall extending upward from the first bead to a first edge of a substantially horizontal tread face located substantially directly above the first bead; a second sidewall extending upward from the second bead and then curving toward a second edge of the tread face such that a curved tire surface is provided between the second bead and the second edge of the tread face, the tread face having a width that is less than half of a distance between the first and second beads;
  a right rim, to which the right tire is mounted; and
  a left rim, to which the left wheel is mounted;
 an axle to which the right wheel is mounted such that the first sidewall of the right tire is on a left side of the right wheel and on which the left wheel is mounted such that the first sidewall of the left tire is on a right side of the left wheel, wherein a gap is defined between the first sidewall of the right tire and the first sidewall of the left tire;
 a drive extending through the gap to the axle to rotate the right and left wheels and drive the motorcycle, such that the drive passes between the first sidewall of the right tire and the first sidewall of the left tire, with the first sidewall of the right tire being positioned to one side of the drive and the first sidewall of the left tire being positioned to the other side of the drive;
 wherein the drive extends in a plane substantially perpendicular to the axis of rotation of the right wheel and the left wheel, the plane passing between the first sidewall of the right tire and the first sidewall of the left tire; and
 wherein the right and left tires are configured such that when the motorcycle is oriented in a substantially vertical position on a flat ground surface, only the tread faces of the right and left wheels are in contact with the ground surface, and such that when the motorcycle is in a leaning position, one of the right and left wheels is above the ground surface, and the motorcycle is supported on the curved tire surface of the other of the right and left tires and at least a portion of the tread surface of the other of the right and left tires is positioned above the ground surface.

2. The apparatus of claim 1 wherein the drive comprises one of a chain extending through the gap and engaging a sprocket on the axle, and a belt extending through the gap and engaging a pulley on the axle.

3. The apparatus of claim 1 wherein the drive comprises a driveshaft extending through the gap and driving a gear box on the axle.

4. The apparatus of claim 3 wherein the first bead of the right and left tires has a diameter larger than the second bead of the right and left tires, and wherein the right and left rims define corresponding right and left recesses beside the gap, and wherein the gear box occupies at least a portion of the right and left recesses.

5. The apparatus of claim 1 wherein the gap is located substantially midway between the second bead of the right tire and the second bead of the left tire.

6. A motorcycle apparatus comprising the rear tire and wheel apparatus of claim 1, and a frame member attached to the axle at a rear end thereof, and pivotally attached to a motorcycle front portion about a substantially horizontal pivot axis oriented substantially perpendicular to a motorcycle operating travel direction.

7. The apparatus of claim 6 wherein the rear end of the frame member is attached to corresponding right and left ends of the axle.

8. The apparatus of claim 6 wherein the rear end of the frame member extends through the gap and is attached to a middle section of the axle.

9. The apparatus of claim 6 further comprising a bias element exerting a downward bias force on the frame member relative to the motorcycle front portion.

10. A motorcycle assembly for a rear wheel of a motorcycle, the assembly comprising:
 a right wheel mounted on an axle, the right wheel comprising a right tire mounted on a right rim and with a left sidewall extending upward from a left bead to a left edge of a substantially horizontal tread face located substantially directly above the left bead, and a right sidewall extending upward from a right bead and then curving toward a right edge of the tread face such that a curved tire surface is provided between the right bead and the right edge of the tread face, wherein the tread face has a width that is less than half of a distance between the right and left beads;
 a left wheel mounted on the axle, the left wheel comprising a left tire mounted on a left rim and with a right sidewall extending upward from a right bead to a right edge of a substantially horizontal tread face located substantially directly above the right bead, and a left sidewall extending upward from the left bead and then curving toward a left edge of the tread face such that a curved tire surface is provided between the left bead and the left edge of the tread face, wherein the tread face has a width that is less than half of a distance between the right and left beads;
 wherein the right and left wheels are mounted on the axle such that a gap is defined between the first side wall of the right tire and the first sidewall of the left tire;
 a drive extending through the gap to the axle to rotate the right and left wheels and drive the motorcycle such that the drive passes between the first sidewall of the right tire and the first sidewall of the left tire, with the first sidewall of the right tire being positioned to one side of the drive and the first sidewall of the left tire being positioned to the other side of the drive;
 wherein the drive extends in a plane substantially perpendicular to the axis of rotation of the right wheel and the left wheel, the plane passing in between the first sidewall of the right tire and the first sidewall of the left tire; and
 wherein the right and left tires are configured such that when the motorcycle is oriented in a substantially vertical position on a flat ground surface, only the tread faces of the right and left wheels in contact with the ground surface while the curved tire surfaces of the right wheel and the left wheel are positioned above the ground surface, and such that when the motorcycle is in a leaning position, one of the right and left wheels is above the ground surface, and the motorcycle is supported on the curved tire surface of the other of the right and left tires and at least a portion of the tread surface of the other of the right and left tires is positioned above the ground surface.

11. The assembly of claim 10 wherein the drive comprises one of a chain extending through the gap and engaging a sprocket on the axle, and a belt extending through the gap and engaging a pulley on the axle.

12. The assembly of claim 10 wherein the drive comprises a driveshaft extending through the gap and driving a gear box on the axle.

13. The assembly of claim 12 wherein the first beads have a diameter larger than a diameter of the second beads, and wherein the second sidewalls extend upward substantially the same distance as the first sidewalls before the second sidewalls curve toward the corresponding second sides of the tread faces.

14. The assembly of claim 13 wherein the right and left rims define corresponding right and left recesses beside the gap, and wherein the gear box occupies at least a portion of the right and left recesses.

15. A motorcycle comprising the rear wheel apparatus of claim 12, and a frame member attached to the axle at a rear end thereof and pivotally attached to a front portion of the motorcycle about a substantially horizontal pivot axis oriented substantially perpendicular to an operating travel direction of the motorcycle.

16. The motorcycle of claim 15 wherein the rear end of the frame member is attached to corresponding right and left ends of the axle.

17. The motorcycle of claim 15 wherein the rear end of the frame member extends through the gap and is attached to a middle section of the axle.

18. The motorcycle of claim 15 further comprising a bias element exerting a downward bias force on the frame member relative to the motorcycle front portion.

\* \* \* \* \*